United States Patent
Rink et al.

(10) Patent No.: US 6,170,867 B1
(45) Date of Patent: Jan. 9, 2001

(54) AIRBAG INFLATION GAS GENERATION VIA A DECOMPOSING MATERIAL WITH A LINEAR IGNITION SOURCE

(75) Inventors: Karl K. Rink, Liberty; David J. Green, Brigham City, both of UT (US)

(73) Assignee: Autoliv ASP, Inc., Ogden, UT (US)

( * ) Notice: Under 35 U.S.C. 154(b), the term of this patent shall be extended for 0 days.

(21) Appl. No.: 09/005,274

(22) Filed: Jan. 9, 1998

(51) Int. Cl.[7] .................................................. B60R 21/26
(52) U.S. Cl. ........................... 280/736; 280/741; 280/742
(58) Field of Search .................... 280/741, 736, 280/740, 742

(56) References Cited

U.S. PATENT DOCUMENTS

| | | |
|---|---|---|
| 651,132 | 6/1900 | Davis . |
| 1,056,560 | 3/1913 | Lippincott . |
| 1,805,721 | 5/1931 | Kogl . |
| 2,334,211 | 11/1943 | Miller . |
| 2,403,932 | 7/1946 | Lawson . |
| 2,995,987 | 8/1961 | Fitzpatrick . |
| 3,664,134 | 5/1972 | Seitz . |
| 3,862,866 | 1/1975 | Timmerman et al. . |
| 3,898,048 | 8/1975 | Barber et al. . |
| 3,958,949 | 5/1976 | Plantif et al. . |
| 3,964,256 | 6/1976 | Plantif et al. . |
| 3,985,375 | 10/1976 | Lewis et al. . |
| 3,986,456 | 10/1976 | Doin et al. . |
| 4,358,998 | 11/1982 | Schneiter et al. . |
| 4,896,898 | 1/1990 | Lenzen et al. . |
| 5,002,308 | 3/1991 | Lenzen et al. . |
| 5,033,390 | * 7/1991 | Minert et al. .................... 280/741 |
| 5,060,973 | 10/1991 | Giovanetti . |
| 5,066,039 | 11/1991 | Shitanoki et al. . |
| 5,171,385 | 12/1992 | Michels et al. . |
| 5,230,532 | 7/1993 | Blumenthal et al. . |
| 5,263,740 | 11/1993 | Frey et al. . |
| 5,330,730 | 7/1994 | Brede et al. . |
| 5,348,344 | 9/1994 | Blumenthal et al. . |
| 5,411,290 | 5/1995 | Chan et al. . |
| 5,428,988 | 7/1995 | Starkovich . |
| 5,464,248 | 11/1995 | Sasaki et al. . |
| 5,470,104 | 11/1995 | Smith et al. . |
| 5,483,896 | 1/1996 | Hock et al. . |
| 5,494,312 | 2/1996 | Rink . |
| 5,531,473 | 7/1996 | Rink et al. . |
| 5,536,339 | 7/1996 | Verneker . |
| 5,542,704 | * 8/1996 | Hamilton et al. ................ 280/741 |
| 5,582,806 | * 12/1996 | Skanberg et al. ................ 280/741 |
| 5,620,205 | 4/1997 | Lauritzen et al. . |
| 5,649,720 | 7/1997 | Rink et al. . |
| 5,655,790 | 8/1997 | Faigle et al. . |
| 5,669,629 | 9/1997 | Rink . |
| 5,713,595 | * 2/1998 | Mooney et al. . |

* cited by examiner

*Primary Examiner*—Eric Culbreth
(74) *Attorney, Agent, or Firm*—Sally J. Brown

(57) ABSTRACT

An inflator and method of gas generation are provided using a linear ignition source to initiate reaction of a decomposing material.

24 Claims, 6 Drawing Sheets

AIRBAG INFLATION GAS GENERATION VIA A DECOMPOSING MATERIAL WITH A LINEAR IGNITION SOURCE

CROSS REFERENCE TO RELATED APPLICATIONS

The subject matter of this application is related to prior U.S. patent application Ser. Nos. 08/935,014 and 08/935,016, each respectively filed on Sep. 22, 1997 as a continuation-in-part application of application U.S. Ser. No. 08/632,698, filed on Apr. 15, 1996, now Rink, U.S. Pat. No. 5,669,629, issued Sep. 23, 1997, the disclosures of each of which are hereby incorporated by reference herein and made a part hereof, including but not limited to those portions which specifically appear hereinafter.

BACKGROUND OF THE INVENTION

This invention relates generally to inflatable restraint systems and, more particularly, to an apparatus and method for inflating an inflatable device such as an inflatable vehicle occupant restraint for use in such systems.

It is well known to protect a vehicle occupant using a cushion or bag, e.g., an "airbag cushion," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as "an inflator."

Many types of inflator devices have been disclosed in the art for the inflating of one or more inflatable restraint system airbag cushions. Prior art inflator devices include compressed stored gas inflators, pyrotechnic inflators and hybrid inflators. Unfortunately, each of these types of inflator devices has been subject to certain disadvantages such as greater than desired weight and space requirements, production of undesired or non-preferred combustion products in greater than desired amounts, and production or emission of gases at a greater than desired temperature, for example.

In view of these and other related or similar problems and shortcomings of prior inflator devices, a new type of inflator, called a "fluid fueled inflator," has been developed. Such inflators are the subject of commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996, the disclosures of which are filly incorporated herein by reference.

Such inflator devices typically utilize a fuel material in the form of a fluid, e.g., in the form of a gas, liquid, finely divided solid, or one or more combinations thereof, in the formation of an inflation gas for an airbag. In one such inflator device, the fluid fuel material is burned to produce gas which contacts a quantity of stored pressurized gas to produce inflation gas for use in inflating a respective inflatable device.

While such an inflator can successfully overcome, at least in part, some of the problems commonly associated with the above-identified prior types of inflator devices, there is a continuing need and demand for further improvements in safety, simplicity, effectiveness, economy and reliability in the apparatus and techniques used for inflating an inflatable device such as an airbag cushion.

To that end, the above-identified Rink, U.S. Pat. No. 5,669,629 discloses a new type of inflator wherein a gas source material undergoes decomposition to form decomposition products including at least one gaseous decomposition product used to inflate an inflatable device.

Such an inflator can be helpful in one or more of the following respects: reduction or minimization of concerns regarding the handling of content materials; production of relatively low temperature, non-harmful inflation gases; reduction or minimization of size and space requirements and avoidance or minimization of the risks or dangers of the gas producing or forming materials undergoing degradation (thermal or otherwise) over time as the inflator awaits activation.

There is, however, a continuing need and demand for further improvements in safety, simplicity, effectiveness, economy and reliability in the apparatus and techniques used for inflating an inflatable device such as an airbag cushion. More specifically, there is a need and a demand for an inflator device which can provide at least some of the benefits provided by the inflator of the above-identified Rink, U.S. Pat. No. 5,669,629, wherein a gas source material undergoes decomposition to form decomposition products including at least one gaseous decomposition product used to inflate an inflatable device even when sized to provide desired inflation of the typically larger sized, e.g., larger volume, airbag cushions associated with passenger side airbag inflatable restraint systems.

SUMMARY OF THE INVENTION

A general object of the invention is to provide an improved apparatus and method for inflating an inflatable device such as an inflatable vehicle occupant restraint for use in such inflatable restraint systems.

A more specific objective of the invention is to overcome one or more of the problems described above.

The general object of the invention can be attained, at least in part, through a specified apparatus for inflating an inflatable device. The apparatus includes a first chamber and an ignition assembly. The first chamber contains at least one gas source material which undergoes decomposition to form decomposition products which include at least one gaseous decomposition product used to inflate the device. The ignition assembly includes a linear ignition source to initiate the decomposition of the at least one gas source material in the first chamber and an initiator to ignite the linear ignition source.

The prior art fails to provide an as effective as desired apparatus and method for inflating an inflatable device wherein a gas source material undergoes decomposition to form decomposition products including at least one gaseous decomposition product used to inflate an inflatable device even when sized to provide desired inflation of the typically larger sized, e.g., larger volume, airbag cushions associated with passenger side airbag inflatable restraint systems.

The invention further comprehends an apparatus for inflating an inflatable device in accordance with an alternative embodiment of the invention. Such apparatus includes a first chamber which contains a gas source material of nitrous oxide which undergoes decomposition to form decomposition products including at least one gaseous decomposition product used to inflate the device. The apparatus also includes an ignition assembly. The ignition assembly includes an ignition transfer line to initiate decomposition of at least a portion of the nitrous oxide in the first chamber and an initiator to ignite the ignition transfer line.

The invention still further comprehends methods for inflating an inflatable safety device in a vehicle.

One such method involves igniting a linear ignition source housed within a first chamber of an inflation apparatus and extending for a length therein. Additionally housed within the first chamber, in contact with the linear ignition source, is at least one gas source material. At least a portion of the at least one gas source material in contact with an ignited portion of the linear ignition source decomposes to form decomposition products including at least one gaseous decomposition product. The inflation apparatus subsequently releases inflation gas including at least a portion of the at least one gaseous decomposition product to inflate the inflatable safety device.

As used herein, references to "combustion," "combustion reactions" and the like are to be understood to generally refer to the exothermic reaction of a fuel with an oxidant.

References to "decomposition," "decomposition reactions" and the like are to be understood to refer to the splitting, dissociation or fragmentation of a single molecular species into two or more entities.

"Thermal decomposition" is a decomposition controlled primarily by temperature. It will be appreciated that while pressure may, in a complex manner, also influence a thermal decomposition such as perhaps by changing the threshold temperature required for the decomposition reaction to initiate or, for example, at a higher operating pressure change the energy which may be required for the decomposition reaction to be completed, such decomposition reactions remain primarily temperature controlled.

"Exothermic thermal decomposition" is a thermal decomposition which liberates heat.

As identified above, the term "equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A / (F/O)_S \tag{1}$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

Other objects and advantages will be apparent to those skilled in the art from the following detailed description taken in conjunction with the appended claims and drawings.

DETAILED DESCRIPTION OF THE INVENTION

Figure 1:
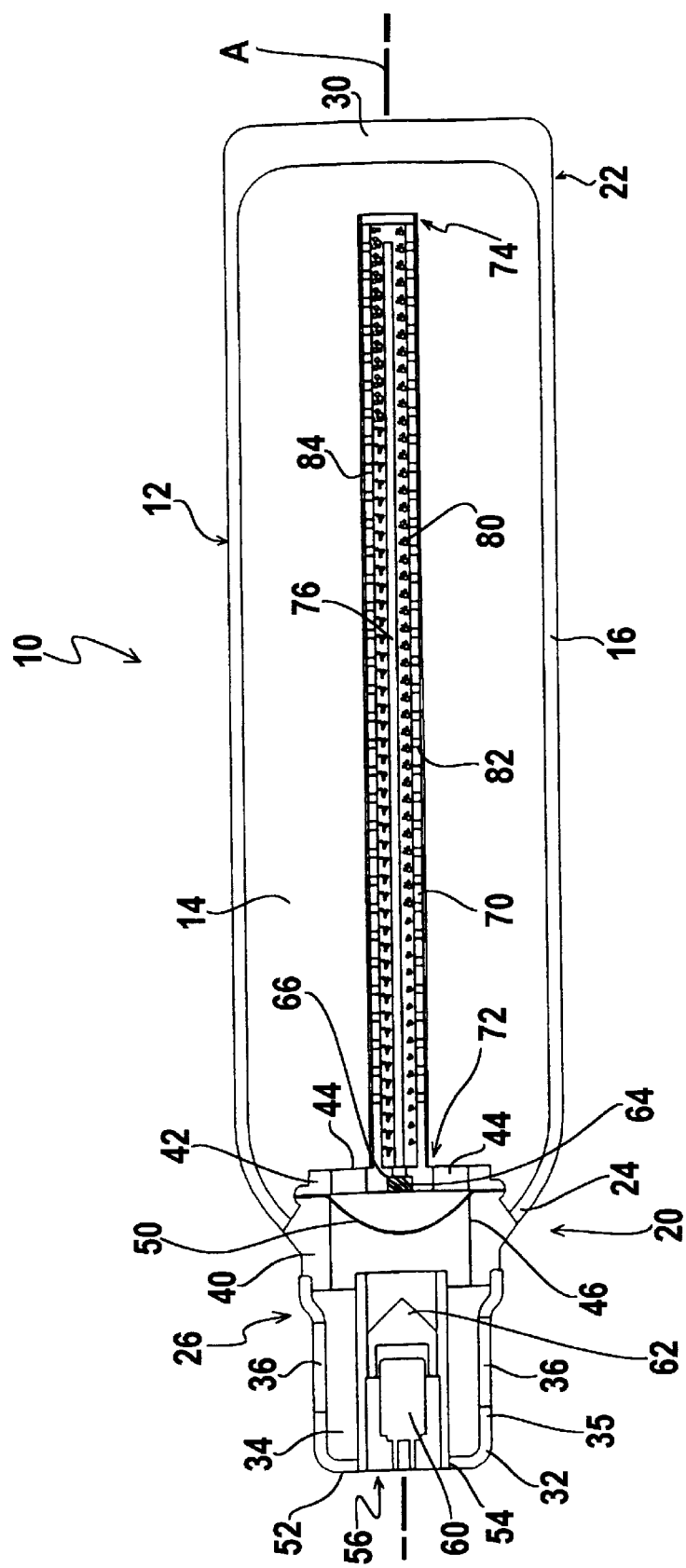
FIG. 1 is a simplified, partially in section, schematic drawing of an airbag inflator assembly with a linear ignition source in the form of a longitudinally extending ignition tube in accordance with one embodiment of the invention.

Referring initially to FIG. 1, there is illustrated an airbag inflator assembly, generally designated by the reference numeral 10, in accordance with one embodiment of the invention. As will be described in greater detail below, the inflator assembly 10 generates inflation gas via a decomposing material. It will be understood that while the invention described hereinafter has general applicability to various types or kinds of airbag assemblies including, for example, driver side and side impact airbag assemblies for automotive vehicles including vans, pick-up trucks, and particularly automobiles, as described in greater detail below, the invention is believed to at least initially have particular utility in passenger side airbag assemblies for such automotive vehicles.

The inflator assembly 10 comprises a pressure vessel 12 including a chamber 14 that contains at least one gas source material which undergoes decomposition to form decomposition products including at least one gaseous decomposition product used to inflate an associated inflatable airbag device (not shown). Thus, the chamber 14 is sometimes referred to herein as a "decomposition chamber."

The chamber 14 is defined by an elongated generally cylindrical sleeve 16, having a first end and a second end, 20 and 22, respectively. The first end 20 is partially closed by means of a shoulder portion 24. As shown, the shoulder portion 24 can desirably be integral (i.e., formed continuous with and in one piece) with the sleeve 16. At the first end 20, an ignition and end cap assembly 26 is attached in sealing relation to the shoulder portion 24, such as by means of a circumferential weld (not shown). The second end 22 is closed by means of a cap portion 30. As shown, the cap portion 30 can desirably be integral (i.e., formed continuous with and in one piece) with the sleeve 16.

The ignition and end cap assembly 26 includes a cup-shaped diffuser portion 32 which defines a mixing chamber 34. The diffuser portion 32 includes a generally circumferential sidewall 35 which includes a plurality of openings 36 for dispensing inflation gas from the inflator 10 into an associated airbag assembly (not shown).

The ignition and end cap assembly 26 additionally includes an end plug portion 40 and an ignition tube base portion 42. As shown in accordance with one embodiment of the invention, the ignition tube base portion 42 includes one or more openings 44 to permit the desired passage of material therethrough. The end plug portion 40 includes a central opening 46 wherethrough material passed thereinto, such as through the ignition tube base portion openings 44, can be passed into the mixing chamber 34 and subsequently out therefrom through the diffuser openings 36.

In the static state, fluid communication between the decomposition chamber 14 and the mixing chamber 34 is normally prevented by the inclusion of a selected sealing means, e.g., by means of a rupture disc 50, such as secured between the end plug portion 40 and the ignition tube base 42, in sealing relation therewith, such as by means of a circumferential weld (not shown) at the periphery of the disc 50. As will be appreciated, the static state inclusion of such a rupture disc 50 serves to normally prevent the flow of the contents of the decomposition chamber 14 from the apparatus 10 such as by preventing passage of material through the end plug portion 40 and into and subsequently out of the diffuser portion 32.

The diffuser portion 32 includes a base end 52 having an opening 54 therein, wherethrough opening means 56 adapted to open the sealing means, e.g., the rupture disc 50, is attached, such as by a weld, crimp or other suitable form of joinder. For example, the opening means 56 is illustrated in the form of a squib 60 and an associated projectile 62, the operation of which will be described in greater detail below.

It is to be appreciated that in addition to the mechanical type of opening realized with the use of a projectile, the invention contemplates and encompasses the use of other forms or types of appropriate opening means. For example, if desired, rather than a mechanical opening realized through the use of a projectile, alternative forms of opening that can be used include the use of an initiator such as to supply heat by which application the rupture disc can be caused to rupture or otherwise open.

The ignition tube base 42 includes a primer storage volume 64. The primer storage volume 64 contains a primer material 66 such as is known in the art, such as a lead styphnate and tetracene type non-corrosive mixture. An ignition tube 70 extends from the ignition tube base 42. The ignition tube 70, in one preferred form of the invention is a relatively long, linear device, preferably longitudinally extending along the central axis A of the decomposition chamber 14.

The ignition tube 70 includes a first and a second end 72 and 74, respectively. In the illustrated embodiment, the first end 72 is shown joined to and extending from the base 42 while the second end 74 is shown as projecting into the decomposition chamber 14 in an unsupported fashion. It will be appreciated, however, that various modifications of the assembly are possible and encompassed herein. For example, the second end 74 can, if desired, be supported such as by projecting to or being attached to the cap portion 30 of the sleeve second end 22. Alternatively or in addition, the ignition tube second end 74 can, if desired, be joined or supported by a supplemental support at a location intermediate between the sleeve ends 20 and 22, respectively.

Within the ignition tube 70 there is disposed a longitudinally extending extruded grain of ignition material 76, commonly referred to as a linear ignition cord. One preferred linear ignition cord useful in the practice of the subject invention is a tin sheathed linear ignition cord composed of 27.5 wt. % dicesium dodecaborohydrate and 72.5 wt. % potassium nitrate, commonly referred to as RDC (rapid deflagration cord).

Also disposed within the ignition tube 70, adjacent the longitudinally extending extruded grain of ignition material 76, is a quantity of supplemental ignition material 80. The supplemental ignition material 80 can be added if needed or desired such as to provide additional heat to augment the dissociative process. The supplemental ignition material may, for example, be a material such as $BKNO_3$ such as in the form of a powder or small granules. It will be appreciated that the invention also contemplates the use of other supplemental ignition materials such as known to those skilled in the art as well as the use of other forms of supplemental ignition materials such as pellets, for example.

The ignition tube 70 includes a plurality of openings 82 axially spaced therealong to permit fluid communication between the reaction products formed upon the ignition of the ignition materials 76 and 80, for example, housed therein and the gas source material stored within the decomposition chamber 14.

The ignition and end cap assembly 26 includes a foil wrap or sheath 84, such as formed of aluminum, in covering relationship with the tube openings 82. It will be appreciated that the inclusion of such a foil sheath may assist in maintaining ignition material in place within the ignition tube 70. For example, the inclusion of such a foil sheath may be desired or advantageous in conjunction with an ignition tube that houses or stores an ignition material in the form of a powder, as shown in FIG. 1. Further, it is to be appreciated that the inclusion of such a foil sheath or the like may beneficially assist in retaining such powder form of ignition material within the ignition tube to prevent or avoid undesired premature discharge of such an ignition material into the decomposition chamber.

As identified above, the contents of the decomposition chamber include at least one gas source material which undergoes decomposition to form decomposition products including at least one gaseous decomposition product used to inflate the associated airbag device. The contents of the decomposition chamber are normally preferably held therein at relatively low pressure. For example, when containing essentially only nitrous oxide, the chamber contents are generally maintained at a pressure in the range of about 500 psi (3.4 MPa) to about 1400 psi (9.7 MPa), preferably in a range of about 650 psi (4.5 MPa) to about 800 psi (5.5 MPa).

It will be appreciated that the pressure of the decomposition chamber can be appropriately varied dependent upon the specific components of the contents contained therein and the physical state thereof. For example, in a decomposition chamber containing a gaseous mixture of nitrous oxide/argon/helium, present in a molar ratio of 20/70/10, the pressure of the decomposition chamber will generally be in the range of about 500 psi (3.4 MPa) to about 5000 psi (34.5 MPa), preferably in the range of about 2000 psi (13.8 MPa) to about 4500 psi (31.0 MPa) and, more preferably, in the range of about 3000 psi (20.7 MPa) to about 4000 psi (27.6 MPa).

In operation, such as upon the sensing of a collision, an electrical signal is sent to the squib 60. The squib 60 fires and propels the projectile 62 into the rupture disc 50 whereby the disc 50 ruptures or otherwise permits the passage of stored contents of the chamber 14 through the base portion openings 44 and out through the diffuser openings 36 into the associated airbag assembly.

As some of the stored nitrous oxide exiting from the inflator assembly 10 will contact the burning pyrotechnic of the squib 60 en route out of the inflator and as the burning pyrotechnic will transfer heat to the exiting gas, decomposition of such exiting nitrous oxide will begin to occur when the gas has been heated to the decomposition temperature of the nitrous oxide. It will be appreciated that the amount or proportion of stored gas undergoing thermal decomposition as a result of thermal contact with such a burning squib will typically be very low as such a method of heating the nitrous oxide is generally not very efficient.

The projectile 62, after contacting and resulting in the opening of the rupture disc 50 proceeds to contact and initiate the primer material 66, resulting in the ignition thereof. The burning primer material 66 in turn ignites the extruded grain of ignition material 76 and results in the ignition of the granules 80. The foil layer 84 is easily ruptured upon such ignition to permit the expanding hot gases to move out through the ignitor tube openings 82. The hot gases then contact and heat the contents of the decomposition chamber 14. Decomposition of the nitrous oxide remaining within the decomposition chamber 14 will begin to occur when such gas has been heated to the decomposition temperature of the nitrous oxide. As described above, in this thermal decomposition, the $N_2O$ begins to breakdown into smaller molecular fragments. Also, as the $N_2O$ molecules fragment, the associated release of energy results in further heating of the remaining mixture. The increase in both temperature and the relative amount of gaseous products within the decomposition chamber 14 results in a rapid pressure rise within the decomposition chamber 14.

It will be appreciated that with such mode of operation, the gas initially released from the inflator 10 will essentially constitute ambient temperature gas which was stored within the decomposition chamber 14 with, as described above, possibly only minor amounts of the original nitrous oxide load will typically undergo decomposition associated with contact with the actuated squib 60.

While the invention has been described above in relation to an embodiment wherein the ignition tube contains or houses both a longitudinally extending extruded grain of ignition material 76, such as a linear ignition cord such as RDC, and a quantity of supplemental ignition material 80, such as $BKNO_3$ in the form of a powder or small granules therearound, and has a foil sheath 84 in covering relation with the openings 82 provided therein, it will be appreciated that the invention in its broader practice is not so limited. For example, with the use of an alternative form of a supplemental ignition material such as in pellet form such as remains substantially intact upon ignition or in the absence of such supplemental ignitor material, the use of a foil sheath in covering relation with the ignitor tube openings may no longer be needed or desired. Thus, one preferred embodiment of the invention includes a linear ignition source in the form of an ignitor tube containing an extruded grain of ignition material without requiring the inclusion of a supplemental ignition material or a foil sheath covering or the like.

It will be appreciated, however, that the inclusion of such a foil sheath or other appropriate covering may still be desired where the primary ignition charge of the assembly is prone to breakage or where the primer material may otherwise have difficulty in igniting such primary ignition charge. Also, with the selection and use of a supplemental ignition material to provide a generally desired linear form of ignition along the length of the ignitor tube, an ignitor tube in accordance with the invention may no longer necessarily include or contain a longitudinally extending extruded grain of ignition material, as in the above-described embodiment.

It will be appreciated, however, that the linear ignition system incorporated within inflators of the invention generally permits the efficient dissociation of large quantities of nitrous oxide, such as typically required or associated with the inflation of the commonly larger sized passenger-sized airbags associated with vehicular inflatable restraint system design. More specifically, the ignition systems utilized in inflators of the invention advantageously produce heat in a quantity and rate effective to maintain a temperature sufficient to result in the desired dissociation for a relatively long period of time. In one preferred form of the invention, the inflator advantageously heats and dissociates most and preferably nearly all of the gas source material while still within the inflator. In accordance with the above-described embodiment, a relatively long, linear ignition charge is used. Preferably, such that the ignition material burns for an elapse time comparable to the residence time of the gas source material within the decomposition chamber so that the gas source material is preferably continuously heated to its dissociation temperature as gas is released from the chamber into an associated inflatable airbag cushion.

Figure 2:
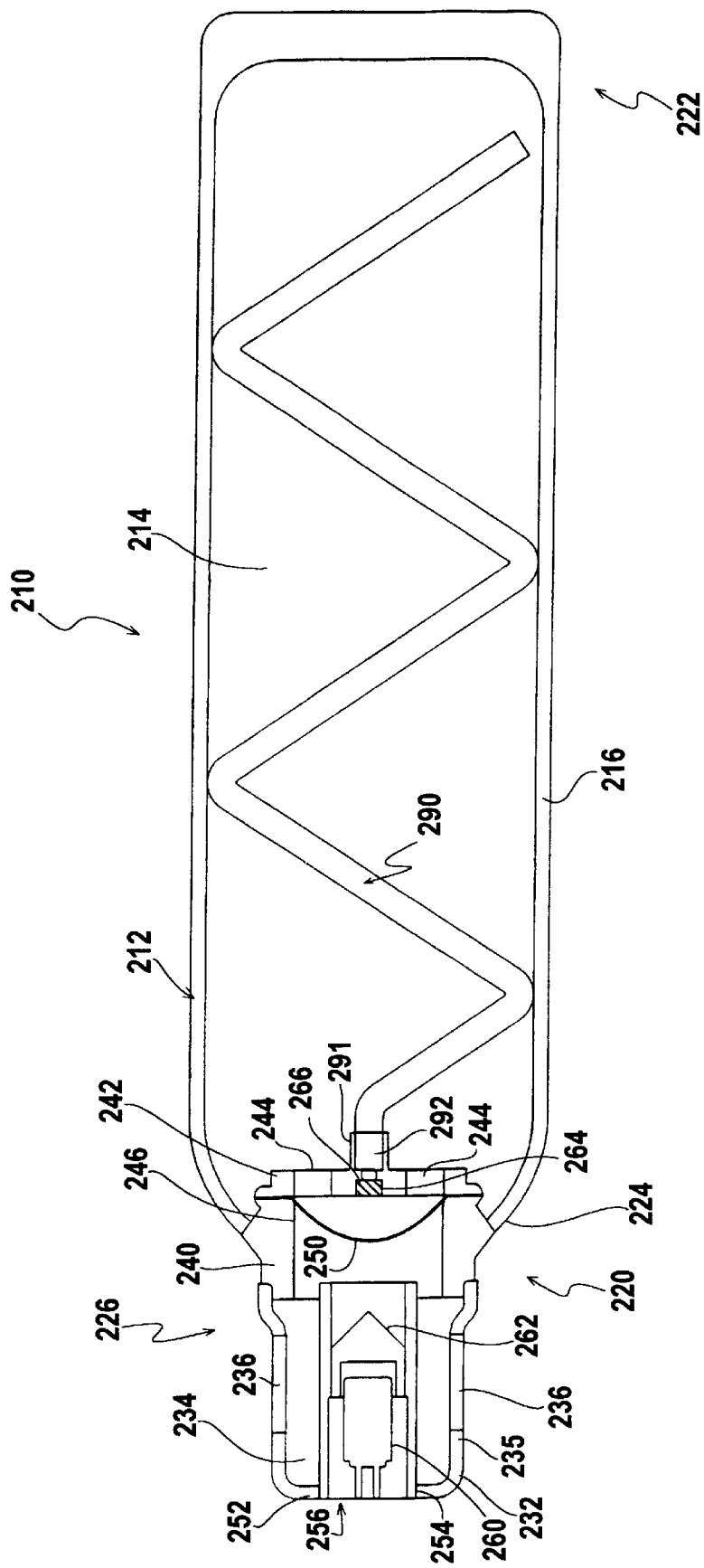
FIG. 2 is a simplified, partially in section, schematic drawing of an airbag inflator assembly with a linear ignition source in accordance with an alternative embodiment of the invention.

FIG. 2 illustrates an airbag inflator assembly, generally designated by the reference numeral 210, with a linear ignition source in accordance with an alternative embodiment of the invention. The airbag inflator assembly 210 is generally similar to the inflator assembly 10, described above. For example, the inflator assembly 210 includes a pressure vessel 212 and forms a chamber 214 that, as with the chamber 14 described above, contains a decomposable gas source material such as $N_2O$ alone or in combination with one or more additional decomposable gas source materials and may, if desired, in addition contain either or both one or more inert gases, such as argon or nitrogen, for example, and one or more additional oxidant gases, such as oxygen, for example.

The chamber 214 is defined by an elongated generally cylindrical sleeve 216, having a first end 220 and a second end 222. An ignition and end cap assembly 226, similar to the ignition and end cap assembly 26 described above, is attached with the shoulder portion 224 at first end 220.

The ignition and end cap assembly 226 includes a cup-shaped diffuser portion 232 that defines a mixing chamber 234. The diffuser portion 232 includes a generally circumferential sidewall 235 which includes a plurality of openings 236 for dispensing inflation gas from the inflator 210 into an associated airbag assembly (not shown).

The ignition and end cap assembly 226 additionally includes an end plug portion 240 and an ignitor base portion 242. The ignitor base portion 242 includes openings 244 to permit the desired passage of material therethrough. The end plug portion 240 includes a central opening 246 wherethrough material passed thereinto, such as through the ignition tube base portion openings 244, can be passed into the mixing chamber 234 and subsequently out therefrom through the diffuser openings 236.

In the static state, a rupture disc 250 such as secured between the end plug portion 240 and the ignitor base 242, in sealing relation therewith, serves to normally prevent the flow of the contents of the decomposition chamber 214 from the apparatus 210.

The diffuser portion 232 includes a base end 252 having an opening 254 therein, wherethrough opening means 256 illustrated in the form of a squib 260 and an associated projectile 262, are joined.

The ignitor base 242, similar to the base 42 of the above-described embodiment, includes a primer storage volume 264 containing a primer material 266 such as is known in the art.

The inflator assembly 210 differs from the inflator assembly 10 described above in the inclusion and utilization of a linear ignition source having the form of a flexible ignition transfer line 290 rather than the form of a relatively long, linear ignition tube longitudinally extending along the central axis of the inflator. Such ignition transfer lines typically can take the form of a small diameter plastic tube coated on the inside surface with a reactive material to sustain ignition from one end of the line to the other. Examples of explosive transfer lines useable in the invention include ITLX (Explosive Technology, Inc., now called OEA Aerospace, Inc.) and NONEL (Ensign Bickford, Inc.). ITLX transfer lines typically include a reactive material comprising a mixture of aluminum powder, ammonium perchlorate and a latex binder and are advantageously characterized by a high energy and flame output. NONEL transfer lines are generally advantageously characterized as burning very cleanly.

The incorporation and use of such an ignition transfer line in accordance with the invention can afford various significant advantages in the design and operation of such inflator devices. For example, to dissociate decomposable gas source materials such as nitrous oxide in relatively large quantities, such as would be expected to be utilized or associated with an inflator designed and sized for normal use in conjunction with the inflation of a passenger sized airbag cushion, it typically will be necessary or at least desired to sustain and transfer the required energy for such dissociation processing for an extended or prolonged period of time. In practice, such an extended period of time can be comparable to the residence time of the decomposable gas source material as it flows from the inflator vessel. Thus, it can be both chemically and physically desirable for such inflator devices to have an ignition charge which is relatively long or which provides desired ignition over an extended period of time.

Flexible ignition transfer lines, such as described above, are well suited to provide an ignition charge which is relatively long and which provides desired ignition over an extended period of time. For example, if desired, such a flexible ignition transfer line can be arranged in a spiral wound arrangement, as shown in FIG. 2, with the length of transfer line controlled by the number of and spacing between the windings.

Another beneficial quality or characteristic of such flexible ignition lines and associated with their use is that such transfer lines are commonly designed to be relatively robust and therefore relatively insensitive to heat and vibration. Consequently, through the use of such transfer lines, the need for the use and inclusion of ignition assembly components such as metal ignition tubes and surrounding screen wraps can be minimized or avoided and thus cost and desirably the weight of the corresponding inflator assembly can be significantly reduced.

To facilitate the incorporation and use of such an ignition transfer line, the ignitor base 242 includes a sleeve 291 which projects from the face opposed to the primer storage volume 264. The sleeve 291 is adapted to receive an end 292 of the flexible ignition transfer line 290 and secure such transfer line end in ignition transferring communication with the primer material 266 stored within the storage volume 264. Thus, when the primer material 266 is ignited, the burning primer material will desirably in turn ignite the transfer line end 292. The ignited transfer line 290 preferably burns in a linear fashion to produce the desired heat input to the decomposition chamber 214, resulting in the desired dissociation of decomposable gas source material housed therewithin.

While in the above described and herein illustrated embodiment the ignition transfer line 290 is described and shown as ignited through the use of a primer actuated by a projectile, it will be appreciated that other forms or techniques for igniting such transfer lines are also encompassed by the invention and the invention is not so limited. For example, such an ignition transfer line can, if desired and in accordance with the invention, be ignited with a standard squib or detonator.

As identified above, the contents of the decomposition chamber include at least one gas source material which undergoes exothermic decomposition to form decomposition products including at least one gaseous decomposition product used to inflate the associated airbag device. A wide variety of gas source materials which undergo decomposition to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

The decomposable gas source materials used in the practice of the invention are preferably:

a.) non-toxic and non-corrosive both in the pre- and post-decomposition states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the decomposition reaction, and which catalysts may be difficult to remove or handle; and d.) form products of decomposition which do not contain undesirable levels of undesirable species, such as carbonaceous material (e.g., soot), CO, NO, $NO_2$, $NH_3$, for example.

Thus, in view of manufacture, storage, and handling concerns, a preferred decomposable gas source material for use in the practice of the subject invention, at this time, is believed to be nitrous oxide ($N_2O$).

In accordance with the chemical reaction (2) identified below, upon the decomposition of nitrous oxide, the decomposition products ideally are nitrogen and oxygen:

$$2N_2O = 2N_2 + O_2 \qquad (2)$$

Nitrous oxide is a now preferred decomposable gas source material as, in practice, nitrous oxide is generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns.

It is to be understood that the decomposable gas source material can, for example and as desired, be stored in a gaseous, liquid or multi-phase form (i.e., partially gaseous and partially liquid mixture). The premium on size generally placed on modern vehicle design, however, results in a general preference for smaller sized airbag inflators. In view thereof and the fact that the densities for such gas source materials are significantly greater when in a liquid, rather than gaseous form, storage of such materials primarily in a liquid form will typically be preferred.

It is also to be understood that while such decomposable gas source material can be contained within the decomposition chamber in a pure form (e.g., such that the chamber contents include no more than minor levels of other materials, such as air as may be present in the decomposition chamber prior to being filled with the decomposable gas source material), it may be preferred to include an inert gas therewith. For example, an inert gas such as helium can be included with the decomposable gas source material to facilitate leak checking of the inflator apparatus or, more specifically, of the decomposition chamber thereof. Alternatively or in addition, an inert gas, such as argon and helium, for example, or mixture of such inert gases, can be included to supplement the gas produced or formed upon the decomposition of the decomposable gas source material.

In addition, the decomposition chamber can, if and as desired, also include a decomposition sensitizer material to promote or accelerate the rate of the decomposition reaction. Such sensitizer materials are typically hydrogen-bearing materials added to the decomposable gas source material in small amounts. Specifically, the sensitizer material is preferably added to the decomposable gas source material in an amount below the flammability limits for the content mix, such that the contents of the decomposition chamber are preferably at an equivalence ratio of less than 0.25. At such low relative amounts, the chamber contents are essentially nonflammable and thus combustion and the formation of combustion products are practically avoided.

Hydrogen bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen bearing sensitizer materials useable in the practice of the invention include paraffins, olefins, cycloparaffins and alcohols. Molecular hydrogen ($H_2$), which does not result in the formation of carbon oxides such as carbon monoxide or carbon dioxide, has been found to be quite effective as a sensitizer and is an especially preferred hydrogen bearing sensitizer material for use in the practice of the invention.

Thus, the invention provides an inflator device and associated method for inflating an inflatable device which reduce or minimize handling concerns and provide inflation gas which desirably is harmless, non-toxic and at relatively low temperature when exiting from the inflator assembly. Further, as the inflator assemblies 10 and 210, illustrated in FIGS. 1 and 2, respectively, in their simplest forms include only a single stored component (i.e., the decomposable gas source material, e.g., $N_2O$), such inflator assemblies and adaptations thereof due to factors such as simplicity and low cost, can find wide utility and use.

It will be appreciated that the exothermic decomposition of $N_2O$, while primarily resulting in the formation of $N_2$ and $O_2$, can also produce some comparatively undesirable products, such as NO and $NO_2$, albeit in relatively small amounts as compared to the amount of $N_2O$ originally present in the chamber. In addition, some of the $N_2O$ may not decompose and may be found in the inflation gas released from the inflator assembly.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1

In this example, an inflator assembly similar to that shown in FIG. 1 was used. The inflator assembly featured a linear ignition system which included a 7 inch (17.8 cm) length of $\frac{1}{16}$ inch (1.6 mm) diameter RDC linear ignition cord. The ignition system also included 5.5 grams of $BKNO_3$ powder surrounding the RDC linear ignition cord within the ignition tube. The ignition tube and the openings therein were covered with a 0.004 inch (0.1 mm) thick aluminum foil sheath. The decomposition chamber of the inflator was filled to contain 172.9 grams of a mixture of 20% $N_2O$, 70% Ar and 10% He (on a molar basis) at an initial pressure of 3800 psi (26.2 MPa) at about 68° F. (20.3° C.). The diffuser featured eight (8) individual exit orifices, each $\frac{1}{8}$ inch (3.2 mm) in diameter. The inflator was fired into a 100 liter test tank.

Discussion of Results

Figure 3:
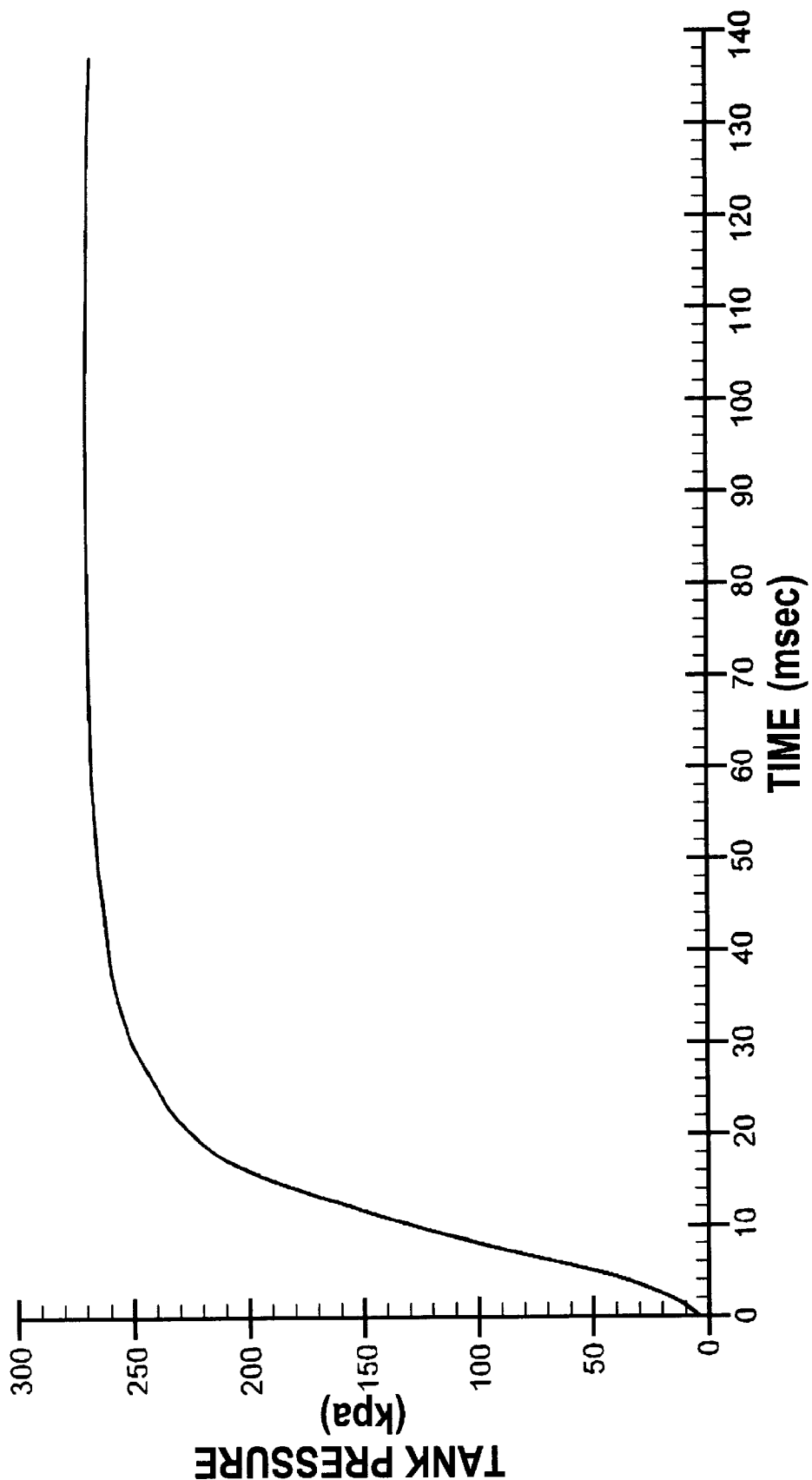
FIG. 3 shows the tank pressure versus time performance obtained in Example 1 using an inflator assembly in accordance with an embodiment of the invention.
Figure 4:
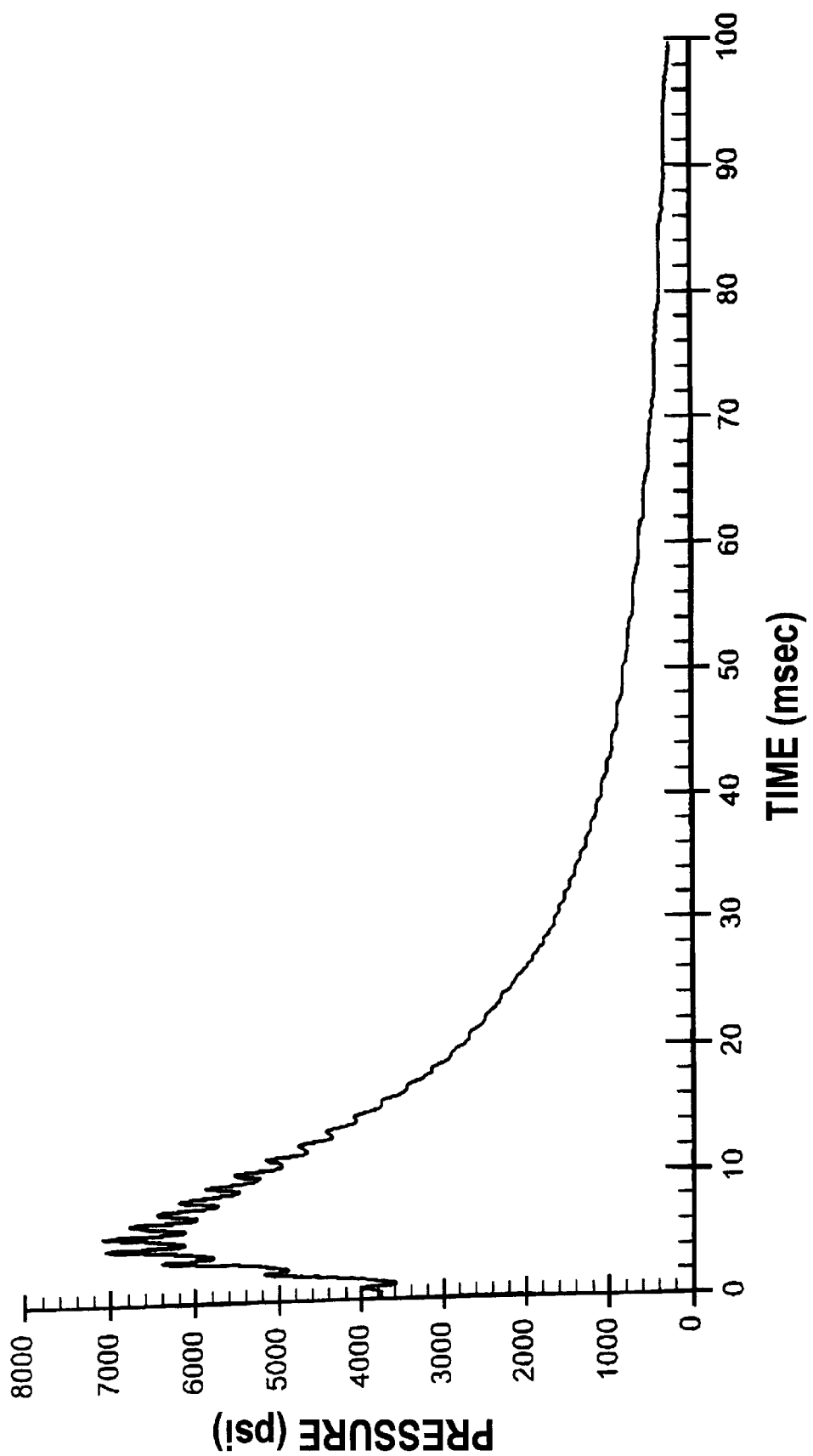
FIG. 4 shows the pressure versus time performance realized within the decomposition chamber of the inflator assembly of Example 1, following actuation of the test inflator.

The resulting tank pressure trace obtained for the inflator in Example 1 is shown in FIG. 3 which shows gas output measured in terms of tank pressure versus time. The corresponding pressure trace obtained within the inflator (as measured by a pressure transducer mounted in a decomposition chamber wall of the inflator) is shown in FIG. 4.

The resulting tank pressure shown in FIG. 3, in view of the initial loading conditions, indicates that the performance of the inflator is adequate to fill a typical passenger-sized airbag cushion. FIG. 4 shows that the maximum internal pressure realized with the inflator of Example 1 was about 7000 psi (48.3 MPa). Such a maximum internal pressure is generally considered typical or customary with at least certain commonly used inflation systems such as certain hybrid inflation systems, for example.

Example 2

An inflator assembly similar to that shown in FIG. 1 was also used in this example. The inflator assembly of this example featured a linear ignition system which, similar to that used in the inflator assembly of Example 1, included a 7 inch (17.8 cm) length of $\frac{1}{16}$ inch (1.6 mm) diameter RDC linear ignition cord. For this example, however, the supplemental ignition material surrounding the RDC linear ignition cord within the ignition tube was composed of a mixture of 2.71 grams of $BKNO_3$ and 12.12 grams of an extruded pyrotechnic composed of transition metal amine nitrate with oxidizer and binder. Such supplemental ignition material was included in the form of a plurality of solid cylinder-shaped "extrudlets" each with a length and a diameter of about 0.09 inch (2.3 mm). The ignition tube and the openings therein were covered with a 0.004 inch (0.1 mm) thick foil sheath. The decomposition chamber of the inflator was filled to contain 168 grams of a mixture of 20% $N_2O$, 70% Ar and 10% He (on a molar basis) at an initial pressure of 3870 psi (26.7 MPa) at about 68° F. (20.3° C.). The diffuser featured eight (8) individual exit orifices, each ⅛ inch (3.2 mm) in diameter. The inflator was fired into a 100 liter test tank.

Discussion of Results

Figure 5:
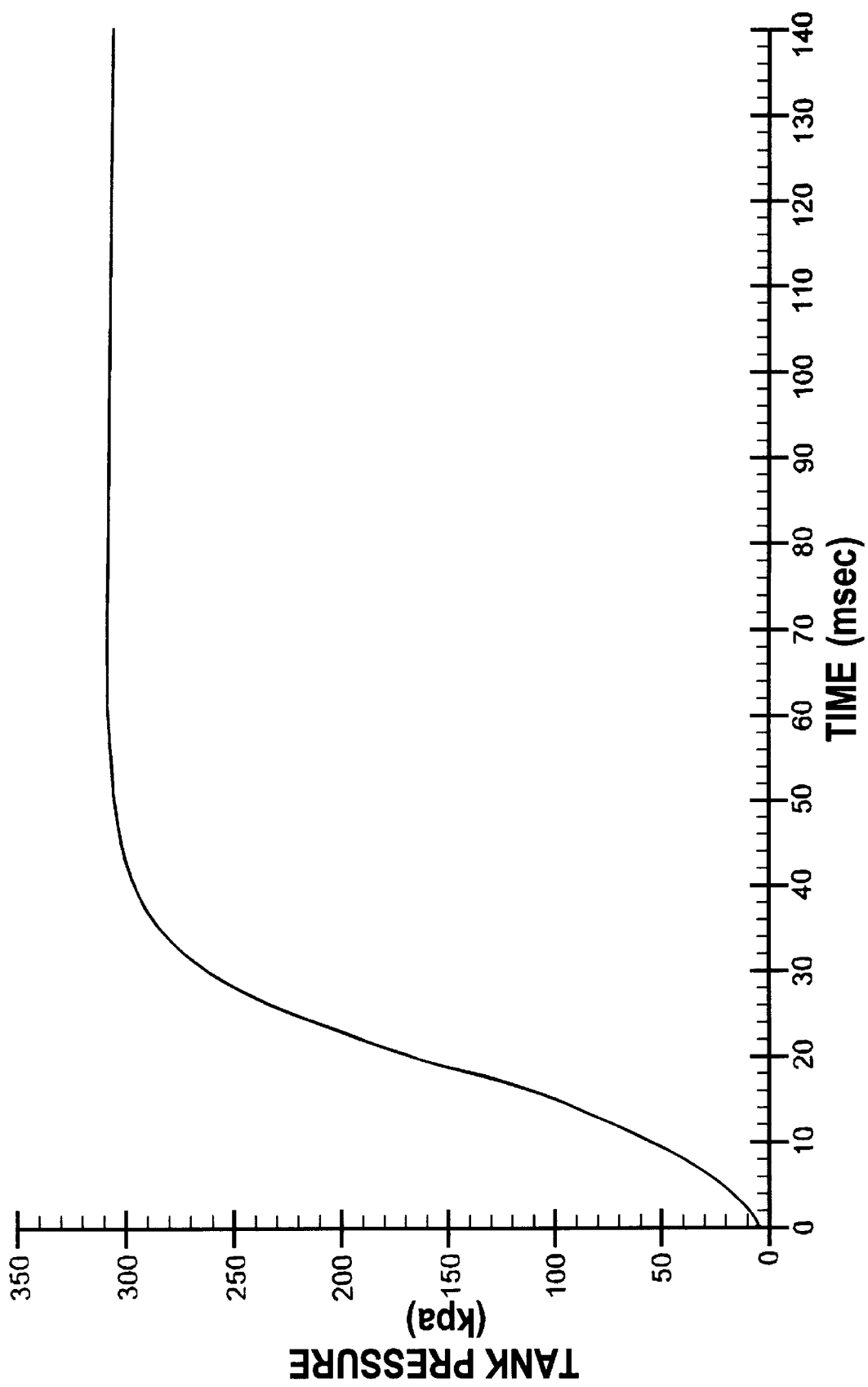
FIG. 5 shows the tank pressure versus time performance obtained in Example 2 using an inflator assembly in accordance with an alternative embodiment of the invention.
Figure 6:
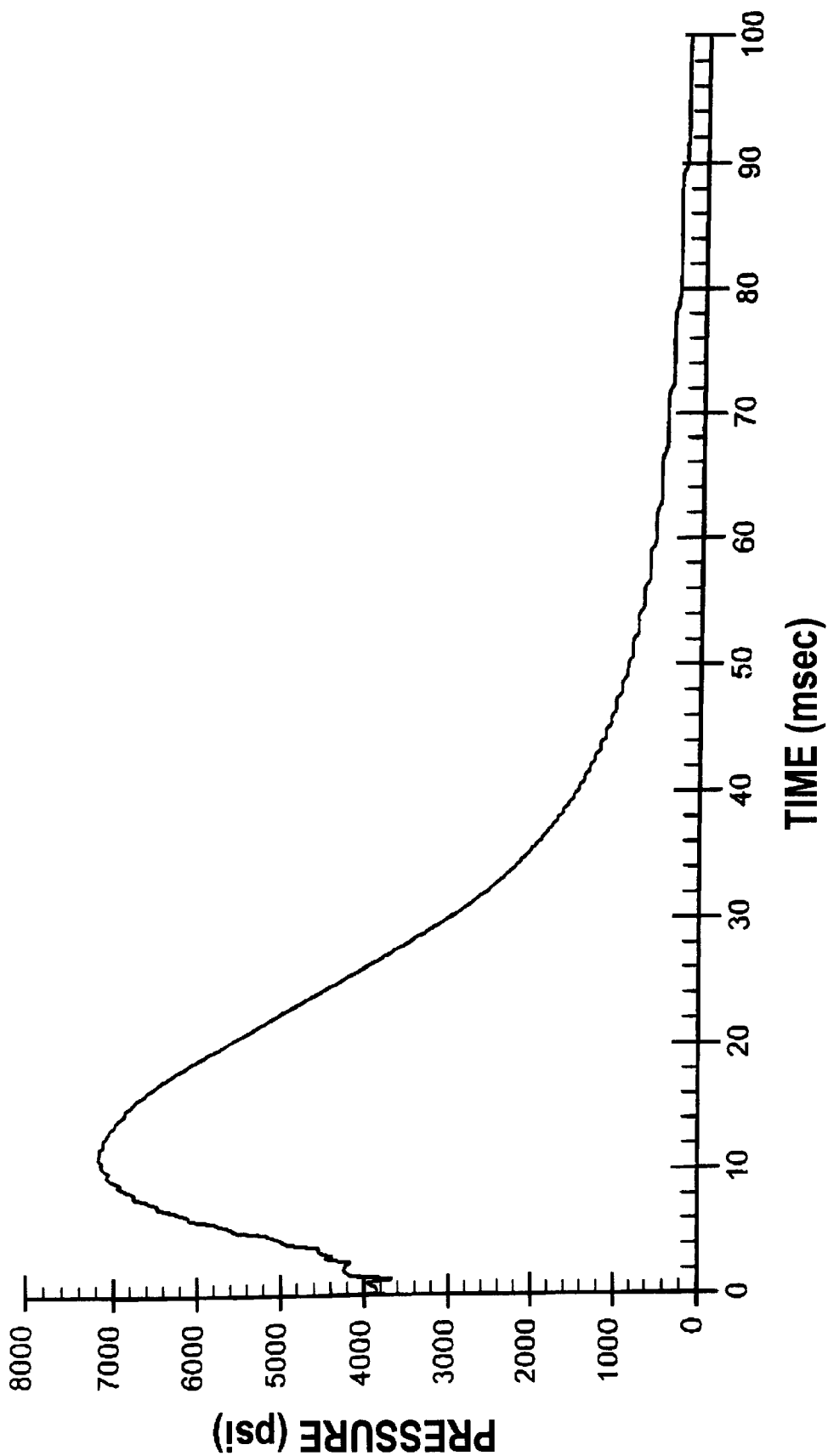
FIG. 6 shows the pressure versus time performance realized within the decomposition chamber of the inflator assembly of Example 2, following actuation of the test inflator.

The resulting tank pressure trace obtained for the inflator in Example 2 is shown in FIG. 5 which shows gas output measured in terms of tank pressure versus time. The corresponding pressure trace obtained within the inflator (as measured by a pressure transducer mounted in a decomposition chamber wall of the inflator) is shown in FIG. 6.

The maximum tank pressure (shown in FIG. 5) was about 308 kPa which was about 36 kPa (5.2 psi) greater than the maximum pressure attained in Example 1. Such higher maximum pressure is attributable to the greater ignitor pyrotechnic load of the inflator of Example 2, as compared to the inflator of Example 1.

The inflator of Example 2 also achieved a slightly greater maximum internal pressure. Such greater maximum pressure is also indicative of the greater pyrotechnic load utilized in Example 2.

A comparison of the results of Examples 1 and 2 reveals a slight but significant difference in the tank pressure curves. More specifically, as shown in FIG. 5, the inflator of Example 2 had a reduced rate of increase of pressure within the tank as compared to the inflator of Example 1. Thus, it will be appreciated that the use, selection, quantity and form (e.g., powder, extrudlets, etc.) of a supplemental ignitor material can be chosen as to provide desired airbag inflation performance.

It is to be understood that the discussion of theory, such as the discussion of the details theorized to be involved with decomposition, for example, is included to assist in the understanding of the subject invention and is in no way limiting to the invention in its broad application.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable device, said apparatus comprising:
a first chamber containing at least one gas source material in a fluid form and which undergoes decomposition to form decomposition products including at least one gaseous decomposition product used to inflate the device, and
an ignition assembly including a linear ignition source to initiate the decomposition of the at least one gas source material in said first chamber and an initiator to ignite at least a portion of the linear ignition source.

2. The apparatus of claim 1 wherein the linear ignition source comprises a linear ignition tube.

3. The apparatus of claim 2 wherein the linear ignition tube contains a linear ignition cord.

4. The apparatus of claim 3 wherein the linear ignition tube additionally contains a quantity of supplemental ignition material.

5. The apparatus of claim 4 wherein the supplemental ignition material is in powder form.

6. The apparatus of claim 4 wherein the supplemental ignition material is in pellet form.

7. The apparatus of claim 2 wherein the linear ignition tube comprises a plurality of axially spaced openings wherethrough ignition material reaction products can exit from the linear ignition tube to contact the at least one gas source material in said first chamber and initiate the decomposition thereof and wherein said apparatus includes a fail sheath normally in covering relationship with the tube openings and openable to permit passage of ignition material reaction products therethrough.

8. The apparatus of claim 1 wherein the linear ignition source comprises a flexible ignition transfer line.

9. The apparatus of claim 8 wherein the ignition transfer line is flexible and extends in a spiral wound arrangement within the first chamber.

10. The apparatus of claim 8 wherein the ignition transfer line extends within the first chamber for a sufficient length selected to provide ignition for the decomposition of the at least one gas source material and to burn for an elapse time comparable to the residence time of the at least one gas source material within the first chamber.

11. The apparatus of claim 1 wherein said first chamber contains a gas source material comprising nitrous oxide.

12. The apparatus of claim 1 wherein the first chamber contains the at least one gas source material at an equivalence ratio of less than 0.25.

13. An apparatus for inflating an inflatable device, said apparatus comprising:
a first chamber containing a gas source material comprising nitrous oxide which undergoes decomposition to form decomposition products including at least one gaseous decomposition product used to inflate the device, and
an ignition assembly including an ignition transfer line to initiate decomposition of at least a portion of the nitrous oxide in said first chamber and an initiator to ignite the ignition transfer line.

14. The apparatus of claim 13 wherein the ignition transfer line is flexible and extends in a spiral wound arrangement within the first chamber.

15. The apparatus of claim 13 wherein the ignition transfer line extends within the first chamber and is of a length selected to provide ignition to the at least one gas source material for a selected period of time.

16. The apparatus of claim 13 wherein said first chamber additionally contains at least one inert gaseous material.

17. The apparatus of claim 13 wherein the first chamber contains the gas source material nitrous oxide at an equivalence ratio of less than 0.25.

18. A method for inflating an inflatable safety device in a vehicle, said method comprising the steps of:
igniting at least a portion of a linear ignition source housed within a first chamber of an inflation apparatus and extending for a length therein wherein the first chamber additionally houses at least one gas source material in a fluid form and in contact with the linear ignition source,
decomposing at least a portion of the at least one gas source material in contact with an ignited portion of the linear ignition source to form decomposition products including at least one gaseous decomposition product, and
releasing inflation gas comprising at least a portion of the at least one gaseous decomposition product from the inflation apparatus to inflate the inflatable safety device.

19. The method of claim 18 wherein the at least one gas source material comprises nitrous oxide.

20. The method of claim 18 wherein the linear ignition source comprises a flexible ignition transfer line.

21. The method of claim 20 wherein the flexible ignition transfer line extends within the first chamber and is of a length selected to provide ignition for the decomposition of the at least one gas source material and to burn for an elapse time comparable to the residence time of the at least one gas source material within the first chamber.

22. The method of claim 18 wherein the linear ignition source comprises a linear ignition tube extending within the first chamber, the linear ignition tube containing a linear ignition cord which is ignited at a first end and burns in a linear fashion to an opposed second end.

23. The method of claim 22 wherein the linear ignition tube additionally contains a quantity of supplemental ignition material wherein said igniting step comprises igniting the linear ignition cord followed by igniting at least a portion of the supplemental ignition material.

24. The method of claim 18 wherein the decomposition occurs at an equivalence ratio of less than 0.25.

* * * * *